United States Patent [19]

Landälv

[11] Patent Number: 5,349,810
[45] Date of Patent: Sep. 27, 1994

[54] HUMID AIR TURBINE (HAT) CYCLE POWER PROCESS

[75] Inventor: Ingvar Landälv, Nynäshamn, Sweden

[73] Assignee: Nykomb Synergetics Aktiebolag, Stockholm, Sweden

[21] Appl. No.: 48,051

[22] Filed: Apr. 16, 1993

[30] Foreign Application Priority Data

Feb. 16, 1993 [SE] Sweden ............... 9300500

[51] Int. Cl.$^5$ .................... F02G 3/00; F02B 43/00
[52] U.S. Cl. .................... 60/39.02; 60/39.05; 60/39.12
[58] Field of Search .......... 60/39.02, 39.05, 39.12; 48/197 R, 206

[56] References Cited

U.S. PATENT DOCUMENTS

| | | | |
|---|---|---|---|
| 4,019,314 | 4/1977 | Springmann | 60/39.12 |
| 4,074,981 | 2/1978 | Slater | 48/197 R |
| 4,075,831 | 2/1978 | McGann | 60/39.05 |
| 4,121,912 | 10/1978 | Barber et al. | 60/39.12 |
| 4,132,065 | 1/1979 | McGann | 60/39.02 |
| 4,150,953 | 4/1979 | Woodmansee | 60/39.12 |
| 4,193,259 | 3/1980 | Muenger et al. | 60/39.12 |
| 4,250,704 | 2/1981 | Bruckner et al. | 60/39.12 |
| 4,590,760 | 5/1986 | Goebel et al. | 60/39.12 |
| 5,117,623 | 6/1992 | Arundale | 60/39.05 |

FOREIGN PATENT DOCUMENTS 0259114 11/1989 European Pat. Off. .
0150990 12/1991 European Pat. Off. .

OTHER PUBLICATIONS

"A Comparison of Humid Air Turbine (HAT) Cycle and Combined-Cycle Power Plants", EPRI Report IE-7300, Mar. 1991.

Primary Examiner—Richard A. Bertsch
Assistant Examiner—Howard R. Richman
Attorney, Agent, or Firm—Burns, Doane, Swecker & Mathis

[57] ABSTRACT

A process for the production of power from a carbonaceous fuel comprising partially oxidizing the fuel with oxygen or an oxygen containing gas to yield a combustible gas stream and sensible heat, said sensible heat or a major part thereof being transferred to the power producing unit together with the combustible gas. The power producing unit is a humid air turbine cycle.

12 Claims, 1 Drawing Sheet

HUMID AIR TURBINE (HAT) CYCLE POWER PROCESS

BACKGROUND OF THE INVENTION

1. Field of the Invention

The present invention relates to a novel configuration for power generation, coupling a so called humid air turbine cycle (HAT) to a partial oxidation scheme.

The configuration comprises the steps of partially oxidizing the fuel with oxygen or an oxygen-containing gas (GASIFICATION) to yield a gas stream containing combustible gas and steam, quenching said stream with water to cool and saturate the stream, removing sulphur compounds from the stream and burning the stream (fuel gas) in a special purpose gas turbine, making direct use of steam contents of the fuel gas.

The gas turbine is arranged in a humid air turbine (HAT) cycle meaning that sensible heat originating from the turbine cycle is transferred to an air saturator as hot water to humidify and saturate the air which is subsequently used in a combustor.

The sensible heat originating from GASIFICATION is transferred to the HAT-cycle via water saturation and heating of the fuel gas.

The main advantage of the present invention is to simplify the integration between the gas generating part and the HAT-cycle and thereby simplifying the design and operation of the plant and minimizing the necessary liaison between the involved technology suppliers.

A further advantage of the present invention is that it simplifies the technology development and manufacture of the combustion turbine set. With the present invention it is possible to utilize the same combustion turbine arrangement when used both as a stand-alone natural gas fired HAT-cycle and when integrated with a gasification plant.

These terms used herein shall have the following meaning:

| | |
|---|---|
| GASIFICATION: | Partial oxidation of a carbonaceous fuel with oxygen or an oxygen-containing gas to yield a gas stream containing combustible gas. |
| GASIFICATION PLANT: | A plant including GASIFICATION and down-stream processes to make the combustible gas from GASIFICATION suitable for burning in a combustion turbine. |
| HAT-cycle: | Humid air turbine cycle in principle as described in EP 0 150 990 B1. |
| IGHAT: | An integration of a GASIFICATION PLANT and a HAT-cycle. |
| CC: | A Combined Cycle unit consisting of a combustion turbine and a steam turbine cycle, the latter cycle receiving its heat from the exhaust heat of the combustion turbine. |
| Carbonaceous fuel: | As used herein means any carbon containing fuel such as coal, oil, bio-fuel and waste fuel. |

2. Description of the Related Art

When utilizing a combustion turbine for power production the combustion turbine is often arranged in a so called combined cycle (CC) configuration comprising a combustion turbine and a steam turbine cycle, the combustion turbine having its air compressor installed on the same shaft as the expander turbine and being designed without intercoolers and the steam turbine cycle taking its heat from the hot exhaust gases from the combustion turbine.

Prior art in the field of integration of a GASIFICATION PLANT and a CC, commonly known as IGCC, includes a CC developed for firing rich fuels such as natural gas or distillates. When such a CC is fed with a lean (diluted) fuel from a GASIFICATION PLANT the air flow from the combustion turbine air compressor must be reduced in order to keep the correct combustion turbine inlet temperature. Such a decrease can be effectively accomplished in a CC if the air compressor has sufficient margin to its surge point.

EP 0 150 990 B1, Process for Producing Power, discloses an alternative method to the CC for recovering the chemical energy in a fuel to produce electric power utilizing a combustion turbine. The sensible heat in the combustion turbine exhaust gases and in the compressed air is utilized to saturate the compressed combustion air with water and to preheat the saturated air and the fuel prior to combustion. This method for producing power has thus eliminated the steam cycle and is commonly known as the Humid Air Turbine cycle or the HAT-cycle.

Integration of a GASIFICATION PLANT and a HAT-cycle, called IGHAT (Integration of Gasification and a Humid Air Turbine Cycle), has been studied for a number of years. A major work describing the state of the art of the IGHAT development is the report "A Comparison of Humid Air Turbine (HAT) Cycle and Combined-Cycle Power Plants" by Electric Power Research Institute in the US, dated March 1991 (IE-7300). The process development approach is based on the principle that all sensible heat available from GASIFICATION and from the HAT-cycle is utilized to produce hot water, which is used to humidify the compressed air in the HAT-cycle before it is fed as combustion air to the combustion turbine. This type of heat integration results in two disadvantages.

1. The GASIFICATION PLANT and the HAT-cycle are highly integrated and will demand strong commercial and technical liaison between two different entities, which in many cases could benefit from being commercially separated.

2. The degree of humidification of the compressed air flow and the size of the air flow differs widely between an independent HAT-cycle using natural gas as fuel and for a HAT-cycle integrated into an IGHAT plant. Therefore different mechanical changes have to be made to the combustion turbine set in order to make it operate efficiently in both applications. This very much increases the cost for the combustion turbine development and manufacture work.

U.S. Pat. No. 5,117,623, Operating Flexibility in IGCC stations, discloses a method for recovering the sensible heat from partial oxidation of a carbonaceous fuel with oxygen or an oxygen-containing gas (GASIFICATION) utilizing a water quench to cool and water saturate the combustible gas stream from said GASIFICATION, passing the stream through a heat exchanger in which the stream is further cooled by heat exchange with circulating water so that liquid water is condensed from the stream, expanding the stream by lowering its pressure and removing sulphur compounds from the stream before or after lowering its pressure, resaturating and heating the stream and then burning the stream in a combustion turbine to produce power, wherein it is the circulating water aforesaid which is used to provide the heat for resaturating the stream.

The process further comprises the step of passing the quenched stream through a boiler to raise steam prior to passing the quenched stream through said heat exchanger for heating circulating water.

The above invention reveals a simple method to transfer the sensible heat from GASIFICATION to the CC utilizing water saturation of the sulphur cleaned gas and steam production. To make the heat transfer more efficient the process includes gas expansion in a gas expander producing power.

EP 0 259 114 B1, Clean Electric Power Generation, discloses a method for the production of electric power from a carbonaceous fuel which comprises partial oxidizing of the fuel with oxygen or an oxygen-containing gas (GASIFICATION) to yield a gas stream containing carbon monoxide and hydrogen (synthesis gas) at supra-atmospheric pressure, quenching the stream with water creating a water saturated stream, expanding the gas stream to produce power, and combusting the expanded stream with additional oxygen or an oxygen-containing gas to produce additional power, characterized in that, prior to expansion, the gas stream is subjected to a carbon monoxide shift reaction whereby at least some of the carbon monoxide therein is converted into carbon dioxide and hydrogen. The process also includes a sulphur removal step. The process further comprises the step of passing the quenched stream through a boiler to raise steam prior to passing the quenched stream to the carbon monoxide shift reactor.

The above disclosure describes a method to transfer the sensible heat from GASIFICATION to the CC utilizing water saturation of the sulphur cleaned gas and steam production. To make the heat transfer more efficient the process includes a carbon monoxide shift reaction and gas expansion in a gas expander to produce power.

BRIEF DESCRIPTION OF THE DRAWINGS

The drawing illustrates the overall process solution of the present invention with the two main block GASIFICATION PLANT and HAT-cycle, the air separation plant 11 shown as being a part of the GASIFICATION PLANT.

DESCRIPTION OF THE PREFERRED EMBODIMENTS

Figure 1:
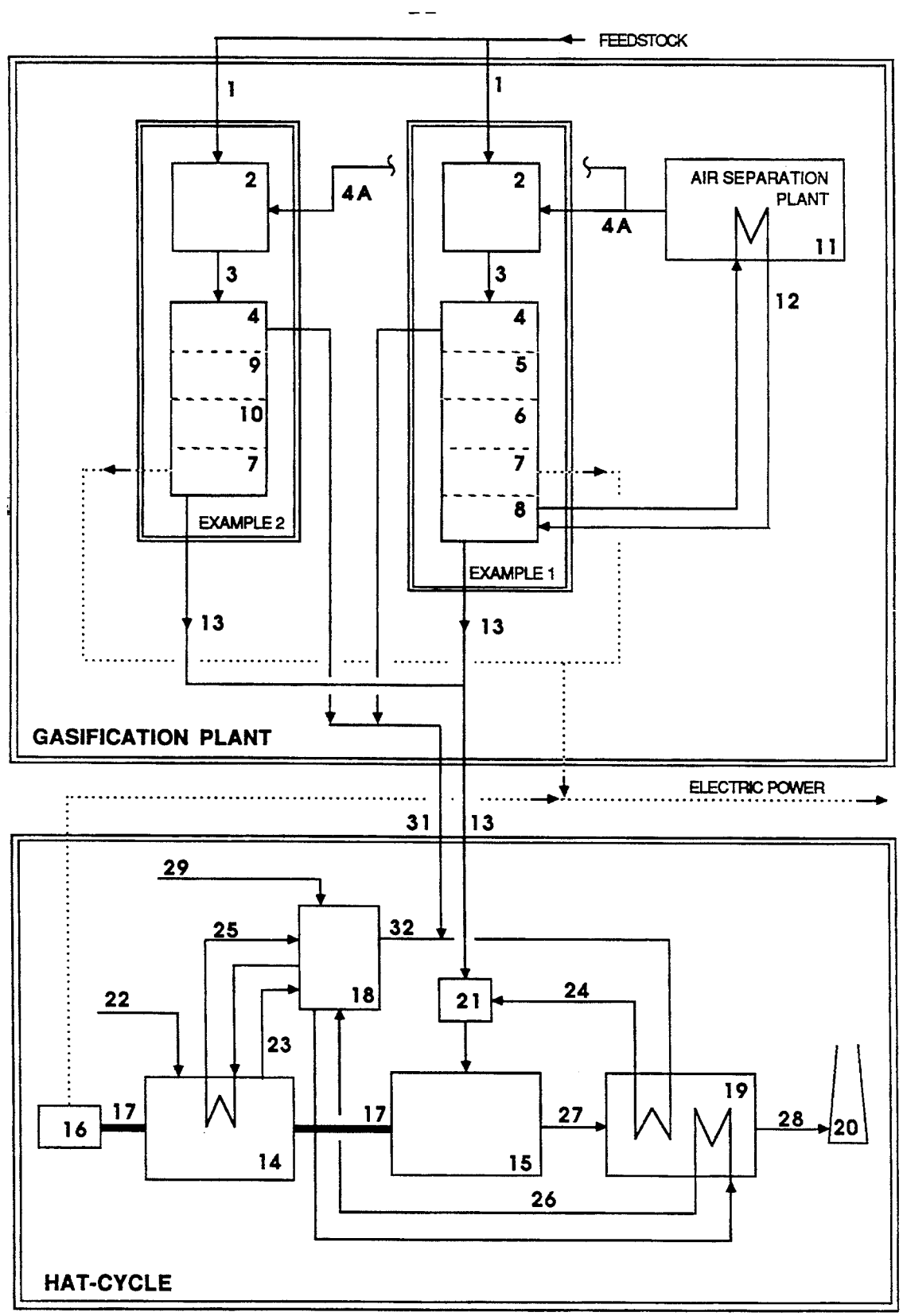
Figure 1:
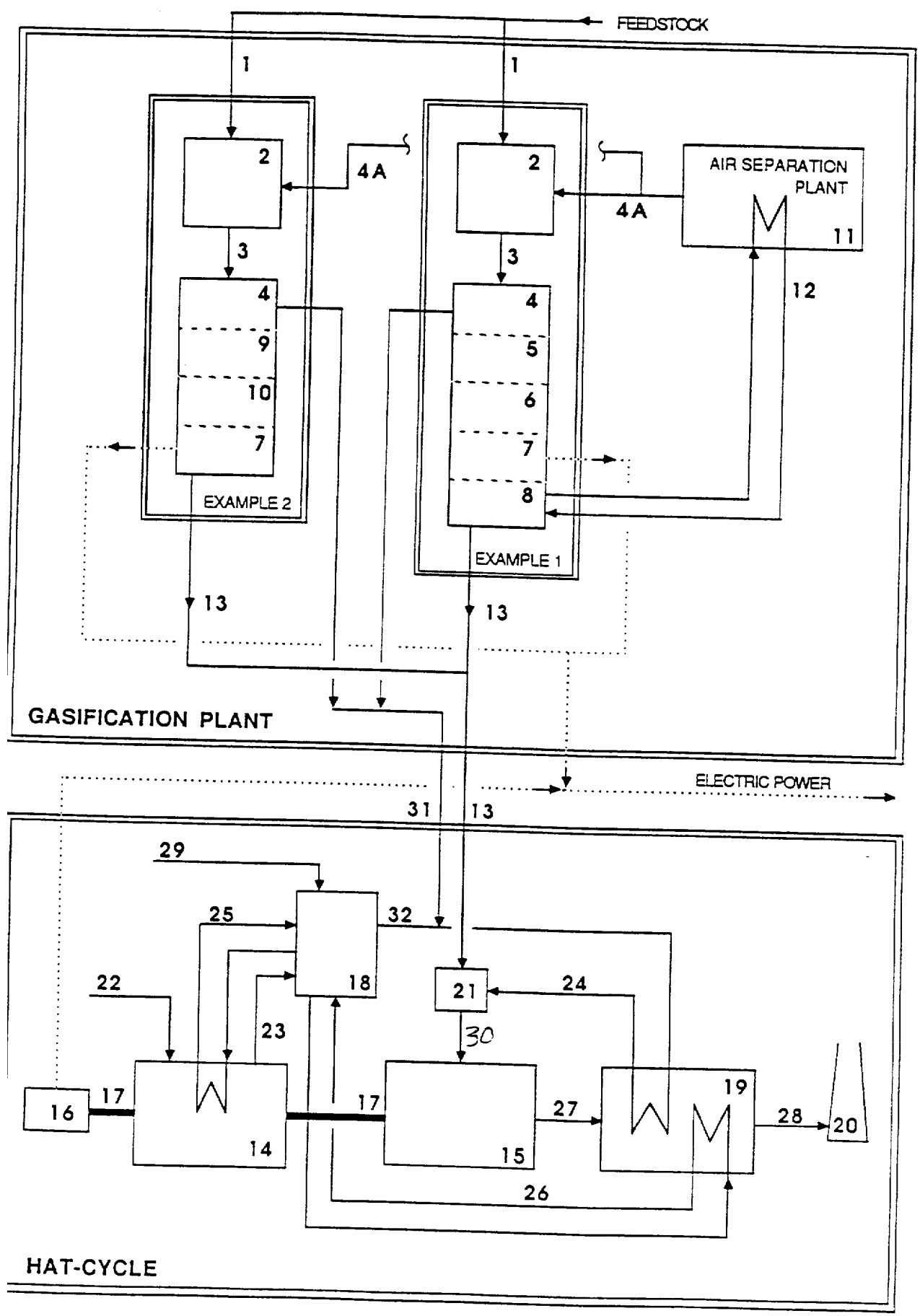

This invention integrates the GASIFICATION PLANT and the HAT-cycle in an energy efficient and technically simple way at the same time as it simplifies the development of a combustion turbine suitable for the HAT-cycle.

The net result of the various chemical reactions occurring during GASIFICATION is exothermic and normally converts 15-30 percent of the energy content of the carbonaceous fuel into sensible heat, of which about 80° percent is recoverable and 20° percent constitutes thermal losses. A water quench is utilized to cool and water saturate the gas producing a stream containing combustible gas and recoverable sensible heat from GASIFICATION represented by the temperature of the gas plus the latent heat of water vapour generated in the water quench. The invention covers a novel means of transferring said recoverable heat to a HAT-cycle.

The invention is exemplified with two cases, which covers two different principles for sulphur cleaning of the gas, namely Example 1: Conventional cold gas cleanup (CGCU)
Example 2: Hot gas clean-up (HGCU).

EXAMPLE 1, GASIFICATION PLANT WITH CGCU

The present invention exhibits special advantages at high GASIFICATION pressures, preferably above 60 bar, since at a higher pressure the water saturated stream will reach equilibrium at a higher temperature and thereby make it possible to produce steam from a boiler located downstream of the water quench at a higher pressure. Further gas cooling downstream of said boiler, gas expansion and clean gas resaturation during which also sulphur removal is carried out at 20°-40° C. either before or after said expansion, follows a process scheme as presented in U.S. Pat. No. 5,117,623.

The recoverable sensible heat from GASIFICATION is thus delivered from the GASIFICATION PLANT as intermediate pressure steam from the boiler, as steam in the saturated, clean gas stream and as additional heat in the clean gas stream resulting in increased temperature of the total, resaturated, clean gas stream.

Sensible heat from the intercoolers of the compressors in the air separation plant, normally being a part of an IGCC or IGHAT plant complex, can also be introduced into the clean gas resaturation loop in the form of a hot water loop.

Example 2, GASIFICATION PLANT WITH HGCU

The present invention exhibits special advantages at high GASIFICATION pressures, preferably above 60 bar, since at a higher pressure the water saturated stream will reach equilibrium at a higher temperature and thereby make it possible to produce steam from a boiler located downstream of the water quench at a higher pressure.

Thereafter the gas stream handling follows a process scheme as presented in EP 0 259 114 B1, which means that the gas stream from said boiler is subjected to a carbon monoxide shift reaction after which the stream is cleaned from sulphur components in a HGCU the cleaning being carried out at a temperature of 350°-500° C. The cleaned gas stream is then passed to a gas expander producing electric power before being fed to a HAT-cycle.

The recoverable sensible heat from GASIFICATION and from said carbon monoxide shift reaction is thus delivered from the GASIFICATION PLANT as intermediate pressure steam from a boiler and as water vapour contained in the cleaned gas stream and as additional thermal enthalpy resulting from heating of the humidified, clean gas stream.

EXAMPLE 1 and 2

The key feature of the novel concept described herein is that the recovery of sensible heat from GASIFICATION is transferred to the HAT-cycle.

1. Together with the clean fuel gas and
2. As intermediate pressure steam.

Alternatively also the sensible heat in the intermediate pressure steam or part thereof can be transferred to the HAT-cycle by injecting it into the clean fuel gas.

Heat of compression from the air separation unit can also be added to the clean fuel gas as saturation heat.

According to the invention, the HAT-cycle thus receives the major part of the sensible heat from GASIFICATION through the clean, saturated fuel gas while a minor part is added to the saturated air flow as intermediate pressure steam downstream of the air saturator in the HAT-cycle.

The invention will be described in more detail in the following with reference to the accompanying drawing which shows the process sequence for carrying out the invention.

With reference to the drawing, the carbonaceous feedstock is supplied via line 1 to the GASIFICATION and water quench unit 2 together with oxygen from the air separation unit 11 via oxygen feed line 4. Unit 2 produces a combustible gas stream saturated with water vapour at the process pressure and the gas stream is supplied via line 3 to a process boiler 4 producing steam which is transferred to the HAT-cycle via line 31.

In Example 1 said gas stream undergoes further cooling in unit 5 producing hot water to be used for resaturation of the gas stream in unit 8, clean gas saturation. In between gas cooling 5 and gas resaturation 8 the gas stream passes sulphur cleaning 6 and expansion 7. Additional resaturation of the clean gas is achieved by utilizing heat of compression from compressor inter- and after-coolers in the air separation plant 11. Said heat is transferred from the air separation plant 11 to the resaturation unit 8 as hot water via line 12. Clean, resaturated gas is supplied to the HAT-cycle via line 13.

In Example 2 the gas stream from the boiler 4 is passed to a CO conversion unit 9 followed by a hot gas clean-up unit for sulphur removal 10 and gas expansion 7. The clean gas stream containing water vapor is supplied to the HAT-cycle via line 13.

The gas expansion 7 is carried out utilizing a gas expander which is equipped with an alternator producing electric power.

The GASIFICATION PLANT shall be operated at high pressure preferably above 60 bar, resulting in more favorable steam data for the steam delivered from the boiler 4 and also resulting in increased power production from the gas expansion unit 7.

The combustion turbine set in the HAT-cycle consists of the combustion turbine 15, the air compressor 14 and the alternator 16 mounted on the same shaft 17.

Air is supplied via line 22 to the air compressor 14 where it is compressed in stages with inter and after coolers utilizing water as cooling media. Said water is fed via line 25 to the air saturator unit 18 where the hot water together with hot water heated by the combustion turbine exhaust 27 meets cold compressed air in an air saturator column within unit 18 said air led to unit 18 via line 23 from the air compressor 14. Saturated air 32 together with intermediate pressure steam from the GASIFICATION PLANT transferred to the HAT-cycle via line 31 is further heated in heat recovery unit 19 before being feed via line 24 to the combustor 21 together with combustible gas from the GASIFICATION PLANT entering the HAT-cycle via line 13. The hot exhaust gas 30 from the combustor 21 drives the expansion turbine 15 and is thereafter transferred to the heat recovery unit 19 via line 27. Heat from the gas turbine exhaust gas is transferred in unit 19 to the saturated air which via line 24 is led to the combustor 21 and to hot water which via line 26 is led to the air saturator unit 18. The cold exhaust gases from the heat recovery unit 19 are sent to the atmosphere via line 28 and stack 20. Water losses via the stack 20 is compensated for by fresh water addition to the HAT-cycle via line 29.

The HAT combustion turbine design as presented in this invention shall preferably be a turbine designed for a rich fuel such as natural gas. All combustion turbines in common use today are designed for rich fuels normally natural gas and distillates. When these latter machines are adopted to lean fuels such as a saturated gas from a GASIFICATION PLANT the air flow from the combustion turbine air compressor is reduced in order to keep constant the expansion turbine inlet temperature. Certain combustion turbine manufacturers can achieve this without decreasing plant power efficiency. This design philosophy shall preferably also be applied for a combustion turbine designed for a HAT-cycle, which means that when the combustor 21 receives lean gas via line 13 and when the saturated air flow is increased with additional steam flow via line 31 the air compressor air flow through line 22 is decreased in order to keep the temperature of the combustor outlet gas in line 30 at the gas turbine inlet design temperature. This design philosophy will make it possible for the combustion turbine manufacturer to develop only one new combustion turbine suitable for effective operation both in stand-alone natural gas fed HAT-cycle applications and in IGHAT-applications.

The transfer of heat between the GASIFICATION PLANT and the HAT-cycle presented in this invention will also simplify the engineering, construction and operation of the IGHAT plant as well as the guarantee undertakings by the major technology suppliers because the battery limit between the two major blocks in the IGHAT can be easily defined.

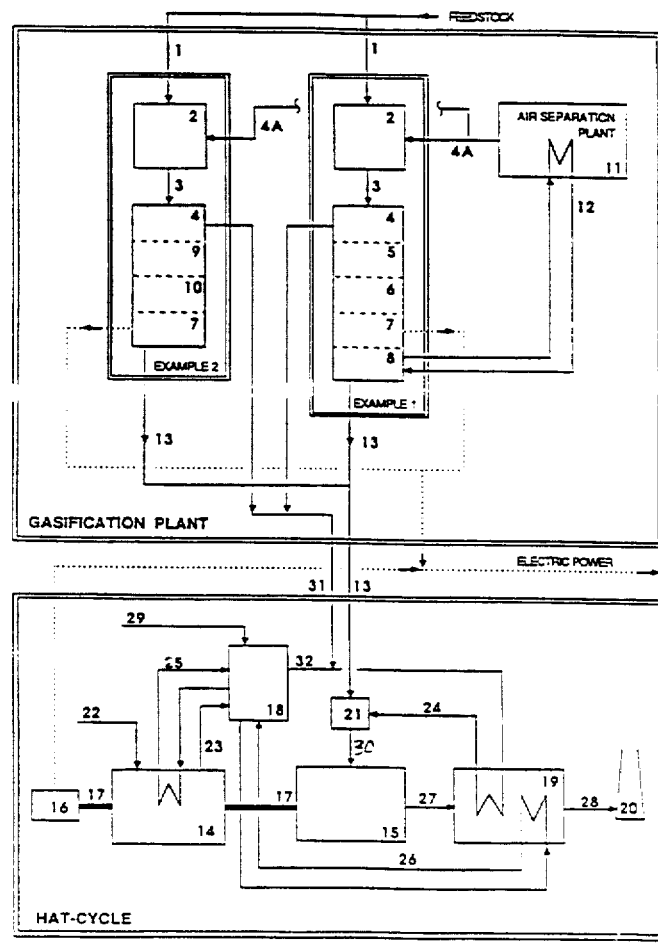

What is claimed is:

1. A process for the production of power from a carbonaceous fuel comprising partially oxidizing the fuel with oxygen or an oxygen containing gas to yield a combustible gas stream and sensible heat wherein said sensible heat or a major part thereof is transferred to a power producing unit with the combustible gas, said power producing unit being a humid air turbine cycle and wherein compression heat from an air compressor powered by a combustion turbine of the power producing unit is used to produce hot water which is used to humidify compressed combustion air before the air is introduced into a combustion turbine combustor of the power producing unit so that sensible heat available in the compressed air is utilized for generation of power in the combustion turbine.

2. A process according to claim 1 wherein the partial oxidation is carried out a pressure of at least 40 bars.

3. A process according to claim 2 wherein the partial oxidation is carried out a pressure of at least 60 bars.

4. A process according to claim 3 wherein steam is utilized to transfer a minor part of the sensible heat to the power producing unit.

5. A process according to claim 2 wherein steam is utilized a transfer a minor part of the sensible heat to the power producing unit.

6. A process according to claim 1 wherein steam is utilized to transfer a minor part of the sensible heat to the power producing unit.

7. A process according to claim 4 wherein sensible heat from inter and after coolers of at least one air separation unit compressor is used to saturate the combustible gas before said gas is transferred to the power producing unit.

8. A process according to claim 3 wherein sensible heat from inter and after coolers of at least one air separation unit compressor is used to saturate the combustible gas before said gas is transferred to the power producing unit.

9. A process according to claim 2 wherein sensible heat from inter and after coolers of at least one air separation unit compressor is used to saturate the combustible gas before said gas is transferred to the power producing unit.

10. A process according to claim 1 wherein sensible heat from inter and after coolers of at least one air separation unit compressor is used to saturate the combustible gas before said gas is transferred to the power producing unit.

11. A process according to claim 1 wherein sensible heat in exhaust gas of the combustion turbine of the power producing unit is used to produce additional hot water which is further used to humidify compressed combustion air before the air is introduced into the combustor of the power producing plant.

12. A process according to claim 1 wherein the process is conducted in the absence of a steam turbine in the power producing unit.

* * * * *

UNITED STATES PATENT AND TRADEMARK OFFICE
CERTIFICATE OF CORRECTION

PATENT NO.   : 5,349,810

Page 1 of 3

DATED:       : September 27, 1994

INVENTOR(S)  : Ingvar LANDÄLV

It is certified that error appears in the above-identified patent and that said Letters Patent is hereby corrected as shown below:

On the title page: Item [54]Title, amend the title to read as follows:

-- MANAGEMENT OF SENSIBLE HEAT FROM GASIFICATION--;

Column 5, line 10, amend "4" to --4A--;

Claim 5, column 6, line 54, amend "a" to --to--; and

In the drawing, add reference number 30 to indicate the line between combustor 21 and expansion turbine 15 as indicated on the attached copy of the drawing.

The title page should be deleted to appear as per attached title page.

Signed and Sealed this

Sixth Day of June, 1995

*Attest:*

BRUCE LEHMAN

*Attesting Officer*         *Commissioner of Patents and Trademarks*

United States Patent [19]
Landälv

[11] Patent Number: 5,349,810
[45] Date of Patent: Sep. 27, 1994

[54] HUMID AIR TURBINE (HAT) CYCLE POWER PROCESS

[75] Inventor: Ingvar Landälv, Nynäshamn, Sweden

[73] Assignee: Nykomb Synergetics Aktiebolag, Stockholm, Sweden

[21] Appl. No.: 48,051

[22] Filed: Apr. 16, 1993

[30] Foreign Application Priority Data

Feb. 16, 1993 [SE] Sweden ............................... 9300500

[51] Int. Cl.⁵ ............................ F02G 3/00; F02B 43/00
[52] U.S. Cl. ................................ 60/39.02; 60/39.05; 60/39.12
[58] Field of Search ................ 60/39.02, 39.05, 39.12; 48/197 R, 206

[56] References Cited

U.S. PATENT DOCUMENTS

| | | | |
|---|---|---|---|
| 4,019,314 | 4/1977 | Springmann | 60/39.12 |
| 4,074,981 | 2/1978 | Slater | 48/197 R |
| 4,075,831 | 2/1978 | McGann | 60/39.05 |
| 4,121,912 | 10/1978 | Barber et al. | 60/39.12 |
| 4,132,065 | 1/1979 | McGann | 60/39.02 |
| 4,150,953 | 4/1979 | Woodmansee | 60/39.12 |
| 4,193,259 | 3/1980 | Muenger et al. | 60/39.12 |
| 4,250,704 | 2/1981 | Bruckner et al. | 60/39.12 |
| 4,590,760 | 5/1986 | Goebel et al. | 60/39.12 |
| 5,117,623 | 6/1992 | Arundale | 60/39.05 |

FOREIGN PATENT DOCUMENTS 0259114 11/1989 European Pat. Off.
0150990 12/1991 European Pat. Off.

OTHER PUBLICATIONS

"A Comparison of Humid Air Turbine (HAT) Cycle and Combined-Cycle Power Plants", EPRI Report IE-7300, Mar. 1991.

*Primary Examiner*—Richard A. Bertsch
*Assistant Examiner*—Howard R. Richman
*Attorney, Agent, or Firm*—Burns, Doane, Swecker & Mathis

[57] ABSTRACT

A process for the production of power from a carbonaceous fuel comprising partially oxidizing the fuel with oxygen or an oxygen containing gas to yield a combustible gas stream and sensible heat, said sensible heat or a major part thereof being transferred to the power producing unit together with the combustible gas. The power producing unit is a humid air turbine cycle.

12 Claims, 1 Drawing Sheet